United States Patent
Lee

(10) Patent No.: US 10,998,565 B2
(45) Date of Patent: May 4, 2021

(54) SYSTEM AND METHOD FOR CONTROLLING COOLANT TEMPERATURE FOR FUEL CELL

(71) Applicants: Hyundai Motor Company, Seoul (KR); KIA Motors Corporation, Seoul (KR)

(72) Inventor: Kevin Lee, Los Angeles, CA (US)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 174 days.

(21) Appl. No.: 16/264,950

(22) Filed: Feb. 1, 2019

(65) Prior Publication Data
US 2020/0251759 A1 Aug. 6, 2020

(51) Int. Cl.
*H01M 8/04701* (2016.01)
*H01M 8/04029* (2016.01)
*H01M 8/04537* (2016.01)

(52) U.S. Cl.
CPC ... *H01M 8/04723* (2013.01); *H01M 8/04029* (2013.01); *H01M 8/04559* (2013.01); *H01M 8/04589* (2013.01); *H01M 2250/20* (2013.01)

(58) Field of Classification Search
CPC ......... H01M 8/04358; H01M 8/04459; H01M 8/04589; H01M 8/04619; H01M 8/04701; H01M 8/0488; H01M 8/0491; H01M 8/0494; H01M 8/04723
See application file for complete search history.

(56) References Cited

U.S. PATENT DOCUMENTS

| | | | | |
|---|---|---|---|---|
| 2008/0299428 A1* | 12/2008 | Miyata | ............... | H01M 8/0488 429/430 |
| 2009/0148727 A1* | 6/2009 | Taniguchi | ......... | H01M 8/04007 429/430 |
| 2010/0112389 A1* | 5/2010 | Miyata | ................ | B60L 50/72 429/429 |

OTHER PUBLICATIONS

Sedghisigarchi "A microprocessor-based controller for high temperature PEM fuel cells"; 2011 IEEE Industry Applications Society Annual Meeting (pp. 1-8). (Year: 2011).*

* cited by examiner

*Primary Examiner* — Gregg Cantelmo
(74) *Attorney, Agent, or Firm* — Brinks Gilson & Lione

(57) ABSTRACT

A coolant temperature control system for a fuel cell stack in a vehicle includes a controller for determining a real time target exit temperature of a fuel cell stack coolant and a communicating device for detecting a fuel cell voltage and a fuel cell current outputted from the fuel cell stack. The real time target exit temperature of the fuel cell stack coolant is determined by an input fuel cell heat to fuel cell power ratio generated from the fuel cell stack for compensating the target exit temperature due to degradation of the fuel cell stack over time. In addition, the coolant temperature control system determines to activate for evaluating the real time target exit temperature of the fuel cell stack coolant when a trip distance of the vehicle is greater than a predetermined travel distance.

12 Claims, 7 Drawing Sheets

SYSTEM AND METHOD FOR CONTROLLING COOLANT TEMPERATURE FOR FUEL CELL

FIELD

The present disclosure relates to a system and method for controlling coolant temperature in a vehicle, and more particularly relates to a system and method for controlling a coolant exit temperature of a fuel cell stack in the vehicle.

BACKGROUND

The statements in this section merely provide background information related to the present disclosure and may not constitute prior art.

Hydrogen fuel cells are an alternative power source to the internal combustion engine for vehicle due to zero harmful exhaust emissions, high efficiencies and the potential to generate hydrogen from renewable methods. A plurality of fuel cells used as the power source are stacked in the vehicle. The vehicle further includes a fuel supplying system that supplies hydrogen, or similar fuels, to the fuel cell stack, an air supplying system that supplies oxygen, which is an oxidizing agent required for an electrochemical reaction, and a water and heat management system that adjusts a temperature of the fuel cell stack, and the like.

When hydrogen is supplied to an anode of the fuel cell stack and oxygen is supplied to a cathode of the fuel cell stack, hydrogen ions are separated by a catalytic reaction in the anode. The separated hydrogen ions are transferred to an oxidizing electrode, which is the cathode, through an electrolyte membrane, and the hydrogen ions separated in the anode generates an electrochemical reaction together with electrons and the oxygen in the oxidizing electrode, such that electric energy may be obtained. In the hydrogen fuel cell vehicle, accordingly, electricity and heat are generated due to movement of electrons generated by the above-mentioned process.

By the process, the fuel cell stack generates electric energy from the electrochemical reaction of hydrogen and oxygen which are reaction gas and discharges heat and water which are the reaction byproducts. Therefore, the fuel cell system in the vehicle includes an apparatus for controlling the temperature of the fuel cell stack. Generally, a cooling system for maintaining the fuel cell stack at a desired temperature in the fuel cell system for a vehicle has widely adopted a coolant type which cools the fuel cell stack by circulating coolant through a cooling channel in the fuel cell stack.

The above information disclosed in this Background section is only for enhancement of understanding of the background of the present disclosure, and therefore it may contain information that does not form the prior art.

SUMMARY

The present disclosure provides a coolant temperature control system and method for controlling the temperature of a fuel cell (FC) stack in a vehicle.

According to one aspect of the present disclosure, the coolant temperature control system includes a controller operable to determine a real time target exit temperature of the FC coolant. The controller is configured for compensating the target exit temperature due to degradation of the FC stack over time. The controller determines an input FC Heat to FC Power ratio generated from the FC stack. The coolant temperature control system further includes a communicating device operable to detect a FC voltage and a FC current outputted from the FC stack. Furthermore, the controller determines constant FC Heat to Power ratios and target FC coolant exit temperatures at a beginning and an end of life of the FC stack for mapping the real time target FC coolant exit temperature.

According to a further aspect of the present disclosure, the controller determines to activate the temperature control system for evaluating the real time target exit temperature of the FC coolant when a trip distance of the vehicle is greater than a predetermined travel distance. The controller sets 30 km as the predetermined travel distance for activating to evaluate the real time target exit temperature of the FC coolant.

According to a further aspect of the present disclosure, each of FC Heat and FC Power is determined by evaluating the detected FC voltage and FC current. The controller evaluates the FC Heat by a following formula: FC Heat=[1.25×(# of FC)−FC Voltage]×FC Current, and the FC Power by the following formula: FC Power=FC Voltage×FC Current.

According to a further aspect of the present disclosure, the constant FC Heat to FC Power ratios are determined by a max FC Heat to FC Power ratio ($Ratio_{max}$) where it is considered at the end of life of the FC stack, and a min FC Heat to FC Power ($Ratio_{min}$) where it is considered at the beginning of life of the FC stack. The target FC coolant exit temperatures are determined by a min target FC coolant exit temperature ($T_{Fc\_Min}$) allowed at the beginning of life of the FC stack, and a max target FC coolant exit temperature ($T_{FC\_Max}$) allowed at the end of life of the FC stack. Accordingly, the controller determines a slope of a calibration line (m) and a x-intercept of the slope of the calibration line (X) for mapping the real time target exit temperature of the FC coolant by the following formulae:

$$m = \frac{Ratio_{max} - Ratio_{min}}{T_{FC\_Min} - T_{FC\_Max}} \text{ and } X = \frac{m \cdot T_{FC\_Max} - Ratio_{min}}{m}.$$

According to a further aspect of the present disclosure, the controller determines the real time target exit temperature of the FC coolant with the determined input FC Heat to FC Power ratio by the following formula:

$$T_{FC\_Target} = X + \frac{Ratio_{input}}{m} + \max\left(\left(T_{FC\_Min} - \left(X + \frac{Ratio_{input}}{m}\right)\right), 0\right) + \min\left(\left(T_{FC\_Max} - \left(X + \frac{Ratio_{input}}{m}\right)\right), 0\right).$$

According to a further aspect of the present disclosure, the FC voltage and FC current is detected by a voltage sensor and a current sensor connected between the FC stack and the communicating device of the system.

According to one aspect of the present disclosure, a method for controlling a coolant temperature for a fuel cell (FC) stack of a vehicle having a controller includes steps of detecting a FC voltage and a FC current outputted from the FC stack, evaluating a generated FC Heat and a FC Power of the FC stack with the detected FC voltage and FC current, determining an input FC Heat to FC Power ratio generated from the FC stack, determining constant FC Heat to FC Power ratios and target FC coolant exit temperatures at a beginning and an end of life of the FC stack for mapping a real time target exit temperature of the FC coolant, and determining the real time target exit temperature of the FC coolant for compensating the target exit temperature due to degradation of the FC stack based on a time of operation of the FC stack.

According to a further aspect of the present disclosure, the method further includes steps of evaluating a trip distance of the vehicle, and determining to activate for evaluating the real time target exit temperature of the FC coolant when the trip distance of the vehicle is greater than a predetermined travel distance. The controller sets 30 km as the predetermined travel distance for activating to evaluate the real time target exit temperature of the FC coolant.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
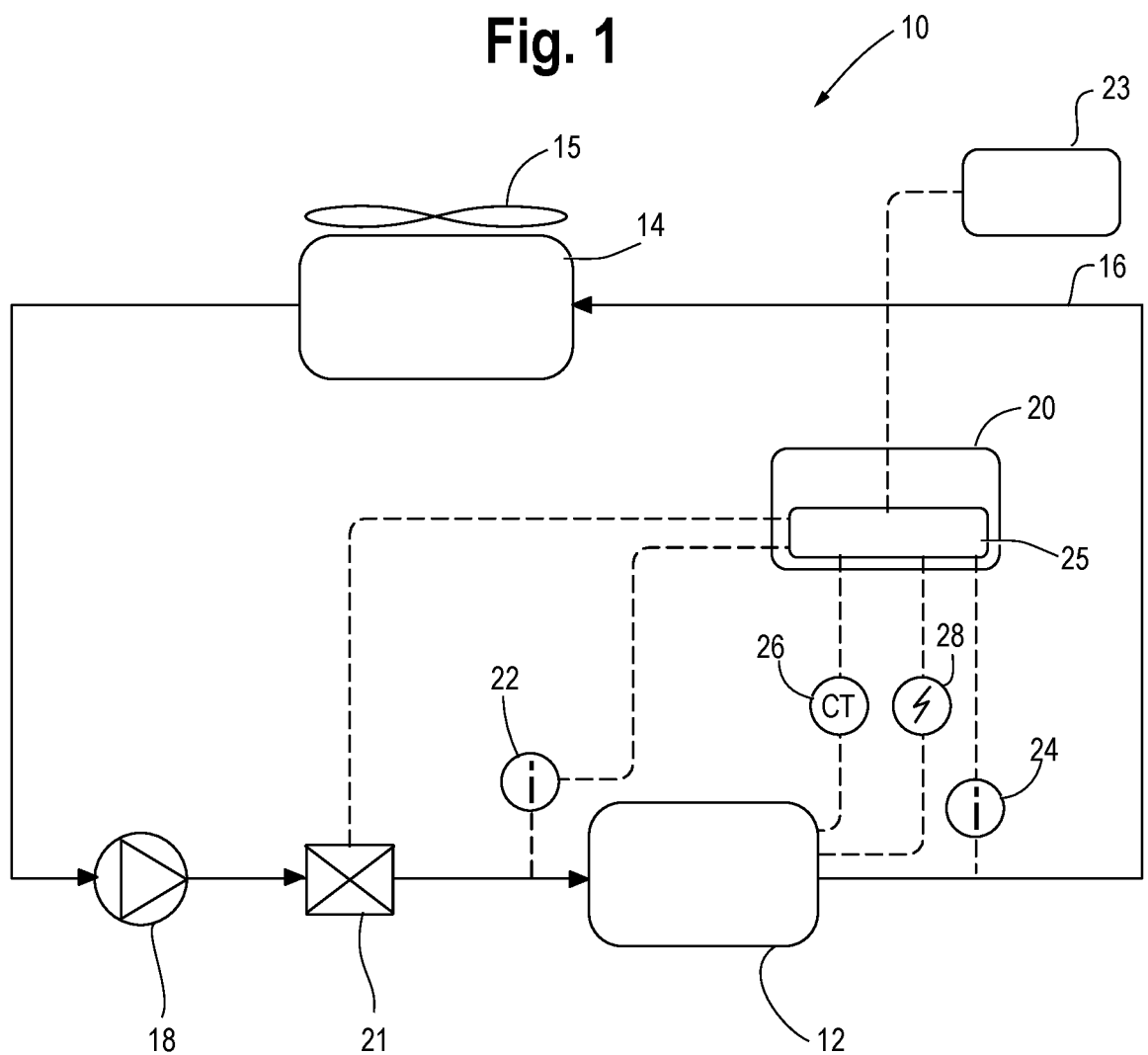
FIG. 1 shows a schematic view of a coolant temperature control system of a fuel cell stack in accordance with an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application or uses. It should be understood that throughout the drawings, corresponding reference numerals indicate like or corresponding parts and features.

Although an exemplary form is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present disclosure may be formed as non-transitory computer readable media on a computer readable medium containing executable program instruction executed by a processor, controller or the like. Examples of the computer readable mediums include, but are not limited to, ROM, RAM, compact disc (CD)-ROMs, magnetic tapes, floppy disks, flash drives, smart cards and optical data storage devices.

FIG. 1 illustrates a coolant temperature control system 10 for a fuel cell (FC) stack 12 in a vehicle. In the example of FIG. 1, the temperature control system 10 is shown in the vehicle having a fuel cell stack 12, but the temperature control system 10 could also be used to cool any other structure with a fuel cell stack 12. As illustrated in FIG. 1, the temperature control system 10 includes a radiator 14 and a cooling fan 15 that receives a heated coolant from the fuel cell stack 12 and discharges heat from the coolant to the exterior, a coolant line 16 disposed between the fuel cell stack 12 and the radiator 14 to circulate the coolant, and a coolant pump 18 for pumping the coolant received from the radiator and delivering the pumped coolant through the coolant line 16 to the fuel cell stack 12.

As shown in FIG. 1, the temperature control system 10 further includes a flow meter 21 for measuring and/or controlling an amount of the coolant, a coolant inlet temperature sensor 22 for measuring the temperature of the coolant entering the fuel cell stack 12, and a coolant exit temperature sensor 24 for measuring the temperature of the coolant coming out from the fuel cell stack 12. Each of the flow meter 21, the coolant inlet temperature sensor 22 and the coolant exit temperature sensor 24 are directly or indirectly connected with a controller 20 including a central processing unit (CPU) in the vehicle. The controller 20 further includes a communicating device 25 for communicating with the flow meter 21 and the sensors 22 and 24. In FIG. 1, the coolant inlet temperature sensor 22 is located at the upstream of the fuel cell stack 12, and the coolant exit temperature sensor 24 is located at the downstream of the fuel cell stack 12.

Furthermore, the communicating device 25 in the controller 20 is communicated with a current sensor 26 for measuring the current output from the fuel cell stack 12 and a voltage sensor 28 for measuring the voltage output from the fuel cell stack 12 as shown in FIG. 1. Accordingly, the controller 20 receives all data from each of the coolant inlet and exit temperature sensors 22 and 24, the current and voltage sensors 26 and 28, and the flow meter 21, and controls all the operation of the temperature control system 10 of the fuel cell stack 12 including the temperature and amount of the coolant flow.

Generally, the temperature control system 10 in FIG. 1 controls the operation by setting a target temperature of the coolant at the exit of the fuel cell stack 12. In the system 10, the controller 20 may detect the coolant exit temperature by communicating with the coolant exit temperature sensor 24, compare the measured temperature to the predetermined target temperature or control the operation of the temperature control system for mapping the target temperature.

Figure 2:
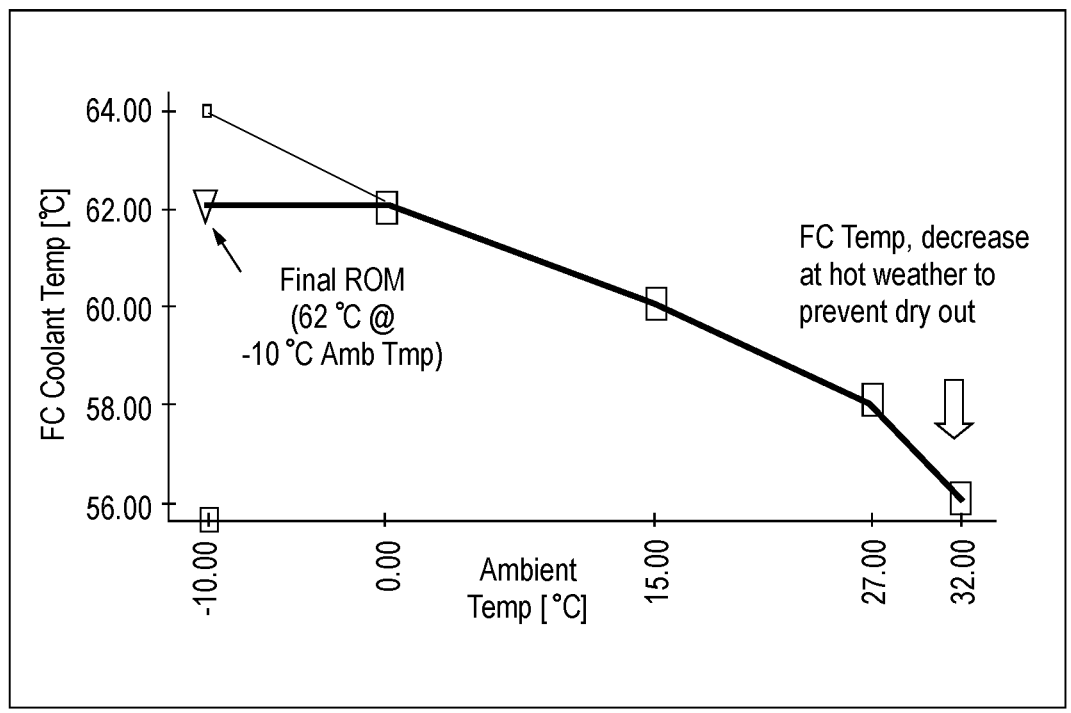
FIG. 2 is a graph illustrating a target FC coolant exit temperature per ambient temperature according to a related art.

In an existing temperature control system as a related art, FIG. 2 illustrates a graph for mapping a fixed target coolant exit temperature of the fuel cell stack per ambient temperature by controlling the operation of the system. As shown in FIG. 2, however, the calibration mapping for controlling the system is based on the fuel cell stack's performance at a beginning of life time, and we have discovered it does not account for stack degradation such as an end of life performance because the target coolant exit temperature of the fuel cell stack per ambient temperature is fixed in the beginning of the life performance. In addition, the target fuel cell coolant exit temperature may be controlled according to an ambient temperature, which is not related to the degradation of the fuel cell stack. For example, the target fuel cell coolant exit temperature at hot weather is decreased for avoiding a dry-out phenomenon of the fuel cell stack. Accordingly, the current mapping control system of the target coolant exit temperature in FIG. 2 may be inadequate because the current system for controlling the target coolant exit temperature does not account for degradation of the fuel cell stack during its life time.

Figure 3:
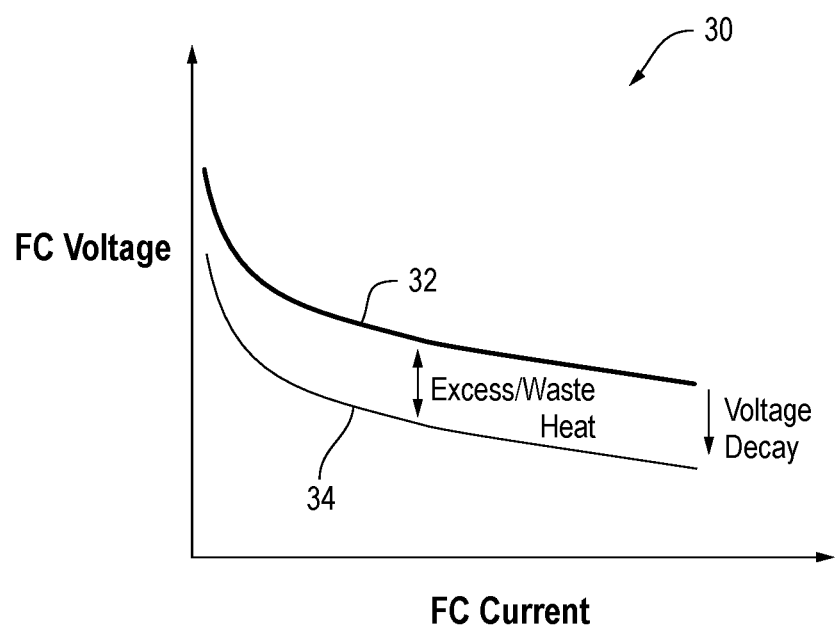
FIG. 3 is an exemplary graph illustrating a voltage degradation of the fuel cell stack at a beginning and an end of life of the fuel cell stack.

FIG. 3 illustrates a graph 30 for the degradation of the fuel cell stack 12 during its life time. The graph 30 shows a fuel cell voltage versus a fuel cell current in the fuel cell stack 12 in the vehicle during its life time. A curve 32 represents the fuel cell voltage versus the fuel cell current at the beginning of the life time and another curve 34 represents the fuel cell voltage versus the fuel cell current at the end of the life time of the fuel cell stack 12 in the vehicle. As shown in FIG. 3, it is occurred that the voltage output of the fuel cell stack during its life time is decreased. Accordingly, as the voltage of the fuel cell stack 12 degrades over mileage in the vehicle, the fuel cell stack 12 creates more waste heat due to the degradation of the fuel cell stack 12.

According to an exemplary form of the present disclosure, the heat of the fuel cell stack 12 generated during the fuel cell stack operation is calculated by a first equation E1, FC Heat Generated=[1.25×(# of Fuel Cells)−FC Voltage (Volts)]×FC Current, where # of Fuel Cells represents the number of the fuel cells installed in the fuel cell stack 12. In E1, if the fuel cell voltages degrade, the heat of the fuel cell stack 12 naturally increases. In addition, if the fuel cell voltage degrades and thus the heat of the fuel cell stack 12 increases, the fuel cell stack 12 pulls more current. Accordingly, the fuel cell coolant temperature control system currently used is inadequate because the generated heat from the fuel cell stack 12 is kept increasing during its life time and at the end of life time of the fuel cell stack 12.

Figure 4:
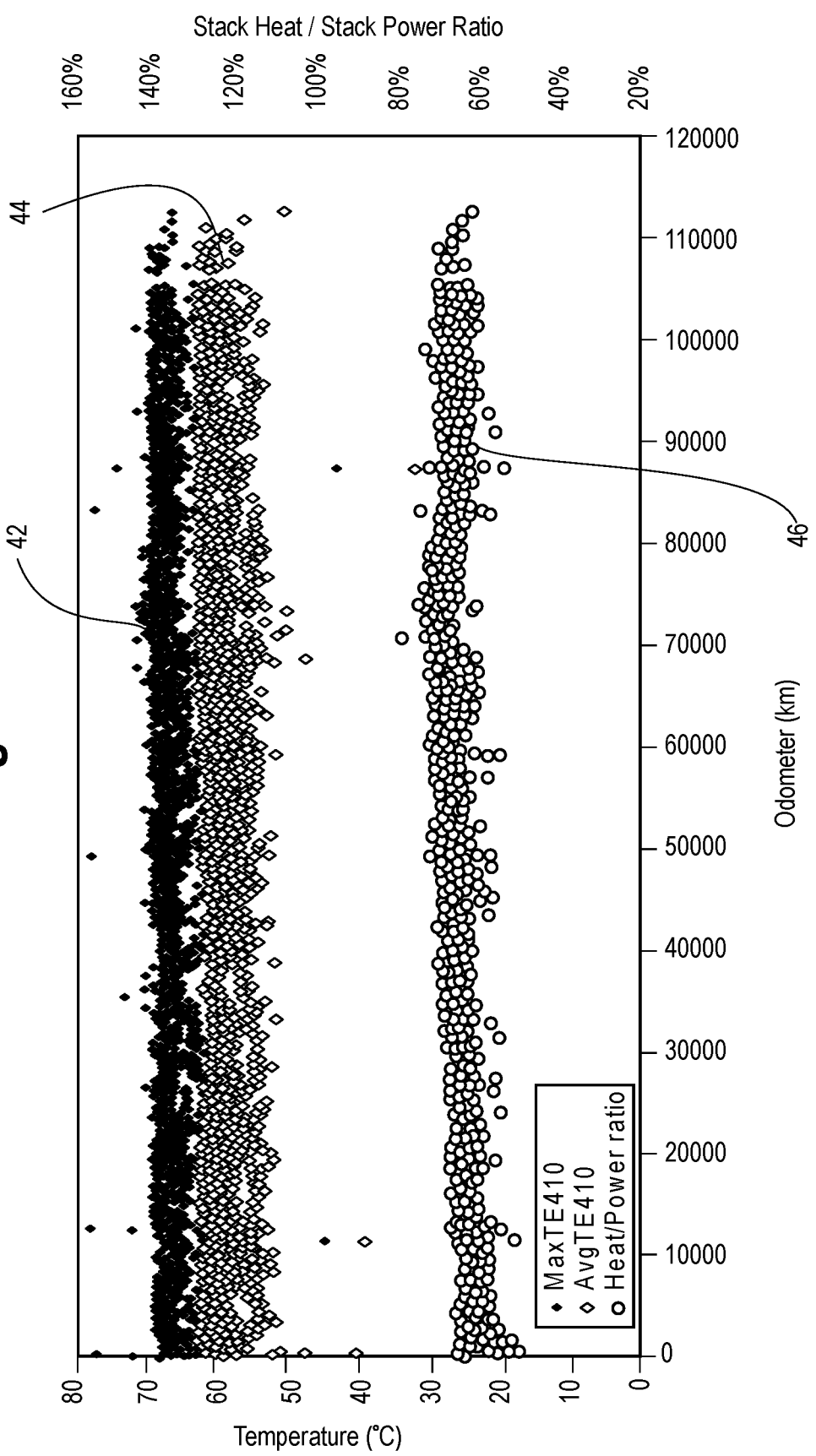
FIG. 4 is an exemplary graph illustrating the fuel cell stack durability fleet data over 100,000 km.

FIG. 4 shows a graph for a fuel cell durability fleet data over 100,000 km, while the fuel cell coolant exit temperature was fixed in its target at the beginning of the life performance. A first data 42 in FIG. 4 represents max fuel cell coolant exit temperature, and a second data 44 represents average fuel cell coolant exit temperature. Both first and second data 42 and 44 show almost constant values over 100,000 km. Therefore, it is difficult for the fuel cell stack's heat value by itself to interpret the fuel cell stack's health status such as a degradation. However, a third data 46 represents a fuel cell (FC) heat to fuel cell (FC) power ratio over 100,000 km. The FC Heat to FC Power ratio is significantly increased over time as shown in FIG. 4. Accordingly, the ratio can be used to indicate the fuel cell stack's health. The FC Heat to FC Power ratio is calculated by dividing the FC Heat calculated from the first equation E1 by the FC Power calculated from a second equation E2, FC Power=FC Volts×FC Current. As shown in FIG. 4, the FC heat to FC Power ratio is around 60% at the beginning of the fuel cell stack's life time, and the ratio is increased to around 75% over 100,000 km. Therefore, as described above, the heat generated from the fuel cell stack 12 during its life time is increased due to the degradation of the fuel cell stack 12, and the excess heat can be evaluated by the FC Heat to FC Power ratio.

Figure 5:
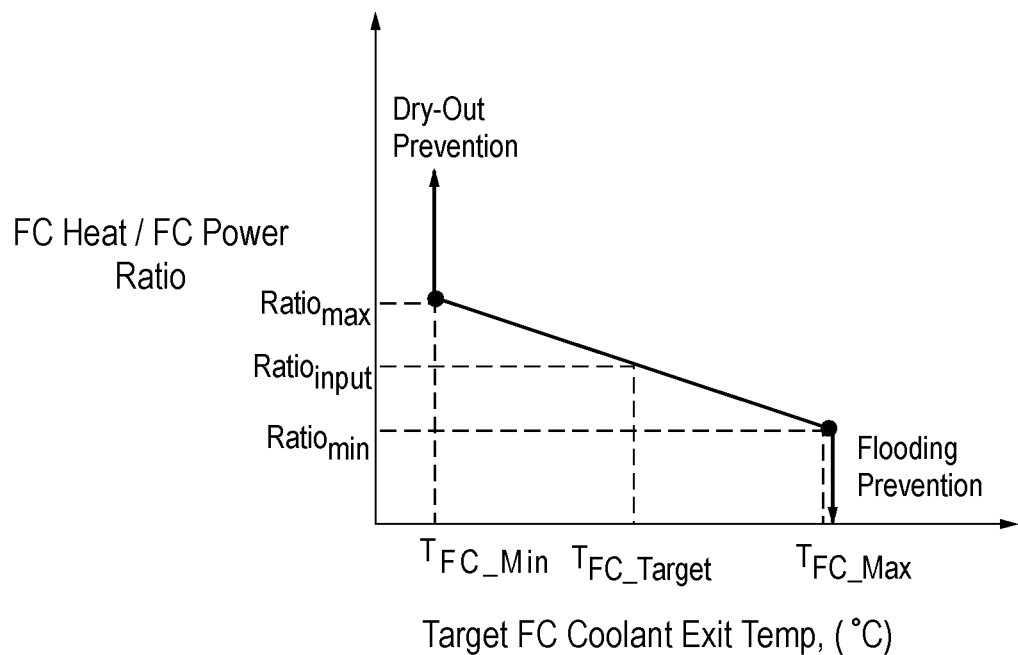
FIG. 5 is a graph illustrating a calibration line for mapping an real time target FC coolant exit temperature in accordance with an exemplary form of the present disclosure.

FIG. 5 shows a graph for mapping a real time target FC coolant exit temperature. In FIG. 5, a $Ratio_{max}$ represents Max FC heat to FC power ratio where it is considered the fuel cell stack end of life, a $Ratio_{min}$ represents Max FC Heat to FC Power ratio where it is considered the fuel cell stack beginning of life, a $T_{FC\_Min}$ represents minimum FC Coolant Exit Temperature allowed at the beginning of life of the fuel cell stack 12, a $T_{FC\_Max}$ represents maximum FC Coolant Temperature allowed at the end of life of the fuel cell stack 12, a $Ratio_{input}$ represents a real time input FC Heat to FC Power Ratio, and a $T_{FC\_Target}$ represents the real time target FC coolant exit temperature based on the current input FC Heat to FC Power ratio. Accordingly, the target FC coolant exit temperature in the system 10 is dynamically determined based on the real time input FC Heat to FC Power ratio over the life time of the fuel cell stack 12.

In FIG. 5, the controller 20 in the temperature control system 10 of the vehicle evaluates a calibration line based on the determined parameters at the beginning and end of life of the fuel cell stack 12 for mapping the real time target FC coolant exit temperature. As described above, the parameters for calculating the calibration line are determined by the constant FC Heat to FC Power ratio at the beginning and end of the life of the fuel cell stack 12, and the FC coolant exit temperatures allowed at each of the beginning and end of life of the fuel cell stack 12. The evaluated calibration line in FIG. 5 is determined to compensate for the degradation of the fuel cell stack 12 over its life time. Accordingly, the real time target FC coolant exit temperature can be determined by mapping the current input FC Heat to FC Power ratio along the calibration line in FIG. 5. Therefore, the controller 20 in the coolant temperature control system 10 can dynamically determines the target FC coolant exit temperature for the excess heat of the fuel cell stack 12 due to its degradation.

As shown in FIG. 5, the real time target FC coolant exit temperature is determined along the calibration line and calculated with the current input FC Heat to FC Power ratio by a third equation E3:

$$T_{FC\_Target} = X + \frac{Ratio_{input}}{m} + \max\left(\left(T_{FC\_Min} - \left(X + \frac{Ratio_{input}}{m}\right)\right), 0\right) + \min\left(\left(T_{FC\_Max} - \left(X + \frac{Ratio_{input}}{m}\right)\right), 0\right),$$

where m represents a slope of the calibration line of the graph and X represents an intercept of the calibration line of the slope. The slope of the calibration line m is calculated by a fourth equation E4, $$m = \frac{Ratio_{max} - Ratio_{min}}{T_{FC\_Min} - T_{FC\_Max}},$$

and the intercept of the calibration line of the slope X is calculated by a fifth equation E5, $$X = \frac{m \cdot T_{FC\_Max} - Ratio_{min}}{m}.$$

The fuel cell stack 12 in the vehicle generates electrical energy by an electrochemical reaction of hydrogen and oxygen which are reaction gas and discharges heat and water which are the reaction byproducts. Since the water which is one of the byproducts is changing its amount and state according to real-time driving conditions of the vehicle including temperature and pressures, etc., it is difficult to estimate the inside phenomenon of the fuel cell stack 12. According to the driving conditions of the vehicle, the water keeps changing its state in the form of steam, the saturated solution and ice. It affects the characteristics of the electron and the gas in which the state change of the water passes the separator channel, gas diffusion layer, catalyst layer, the membrane, etc. (not shown) of the fuel cell stack 12. Due to the state change of the water, accordingly, a "flooding" phenomenon that the water overflows and a "dry-out" phenomenon in which it is short of water are happened in the fuel cell stack 12. Therefore, the real time target FC coolant exit temperature for mapping on the calibration line in FIG. 5 can be also determined for avoiding the dry-out and the flooding phenomenon of the fuel cell stack 12.

Figure 6:
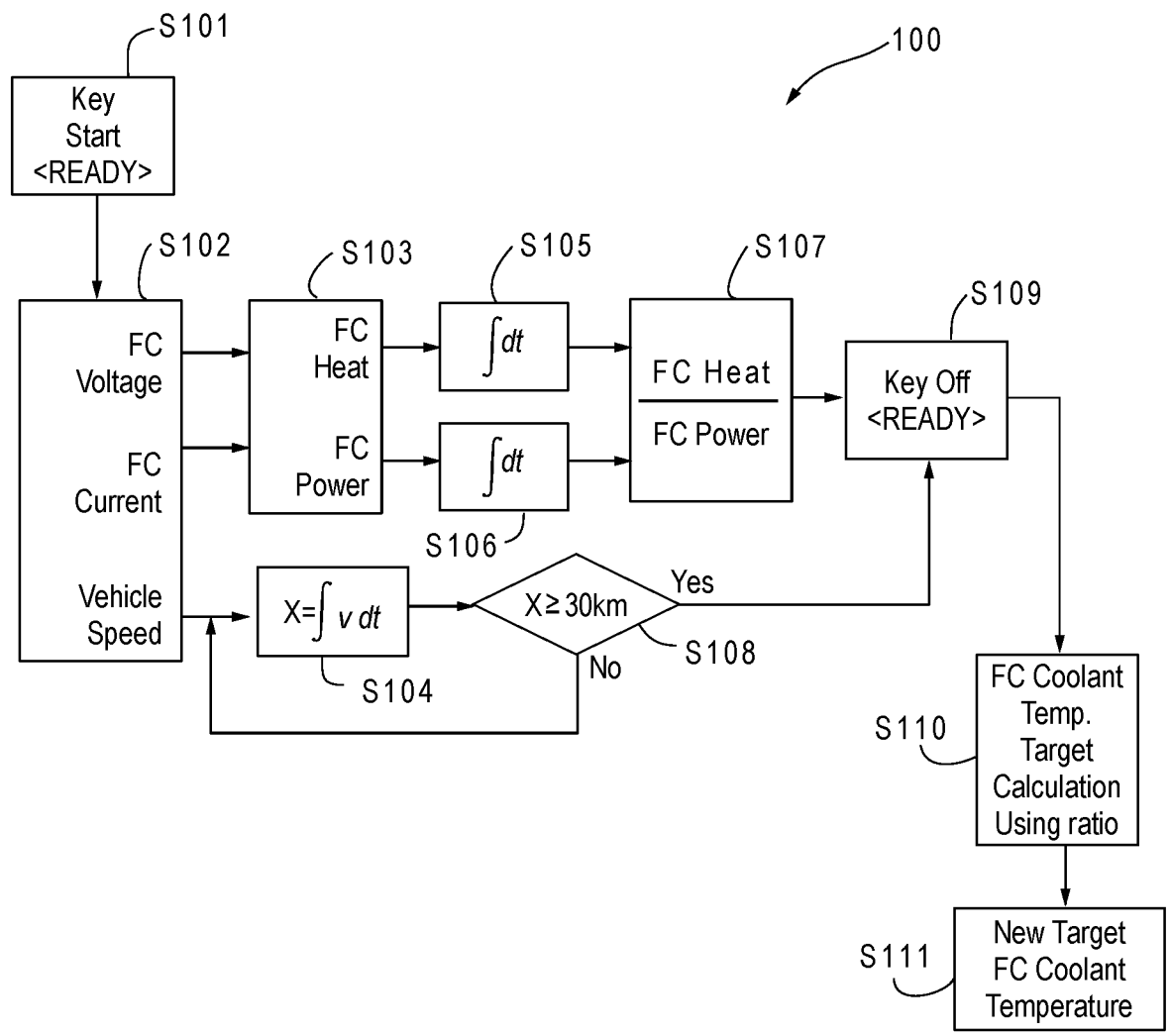
FIG. 6 is a configuration diagram illustrating the coolant temperature control system of the fuel cell stack in accordance with an exemplary form of the present disclosure.

FIG. 6 is an exemplary flow chart 100 illustrating an operation of the controller 20 in the temperature control system 10 according to the present disclosure. As shown in the flow chart 100, the controller 20 determines the real time target or max FC coolant exit temperature with the current input FC Heat to FC Power ratio if a trip distance of the vehicle is greater than a predetermined distance (for example 30 km). If the trip distance of the vehicle is less than the predetermined distance, however, the controller 20 for evaluating the real time target or max FC coolant exit temperature may not be activated because the current input FC Heat to FC Power ratio becomes inaccurate at the battery only operation such as a low fuel cell operation.

In a step S101, the controller 20 starts to operate the dynamic target FC coolant exit temperature system. In a step S102, the controller 20 communicates with the current sensor 26 for detecting the current outputted from the fuel cell stack 12, the voltage sensor 28 for detecting the voltage outputted from the fuel cell stack 12 and a speed sensor 23 (shown in FIG. 1) for detecting a speed of the vehicle. In a step 103, the controller 20 calculates the FC Heat value by the first equation E1 and the FC Power value by the second equation E2 with the collected data from the step S102. Furthermore, in a step S104, the controller 20 calculates the travel distance of the vehicle in a current trip of the vehicle with the collected speed data of the vehicle.

In a step S105, the controller 20 calculates the total FC Heat energy value over time during the travel of the vehicle by integrating all the calculated data from the step S103. In a step S106, the controller 20 calculates the total FC Power value over time during the travel of the vehicle by integrating all the calculated data from the step S103. In a step S107, the controller 20 calculates the current input FC Heat to FC Power ratio during the current trip of the vehicle.

In a step S108, the controller 20 determines whether the travel distance of the vehicle is greater than the predetermined distance in a current trip of the vehicle for activating the system 10 for evaluating the real time target FC coolant exit temperature. For example, the predetermined travel distance of the vehicle is 30 km for activating the system 10 to determine the real time target FC coolant exit temperature. However, the predetermined travel distance according to other form of the present disclosure may be changed. If the controller 20 determines that the trip distance of the vehicle is greater than the predetermined travel distance, the controller 20 activates to calculate the real time target or max FC coolant exit temperature in a step S109. However, If the controller 20 determines that the trip distance is not greater than the predetermined travel distance in the step S108, the controller 20 does not activate for evaluating the real time target or max FC coolant exit temperature and does not proceed the next step.

In a step S110, the controller 20 calculates the real time target or max FC coolant exit temperature by using the third equation E3 with the calculated data in the step S107. In the step S110, furthermore, the controller 20 determines the calibration line for compensating the degradation of the fuel cell stack 12 and mapping the real time target FC coolant exit temperature as shown in FIG. 5. As described above, the calibration line is calculated with the determined data by the fourth and fifth equations E4 and E5, and the real time target FC coolant exit temperature is determined along the calibration line in FIG. 5. In a step S111, accordingly, the calculated real time target FC coolant exit temperature in the step S110 is determined as a new target FC coolant exit temperature.

Figure 7A:
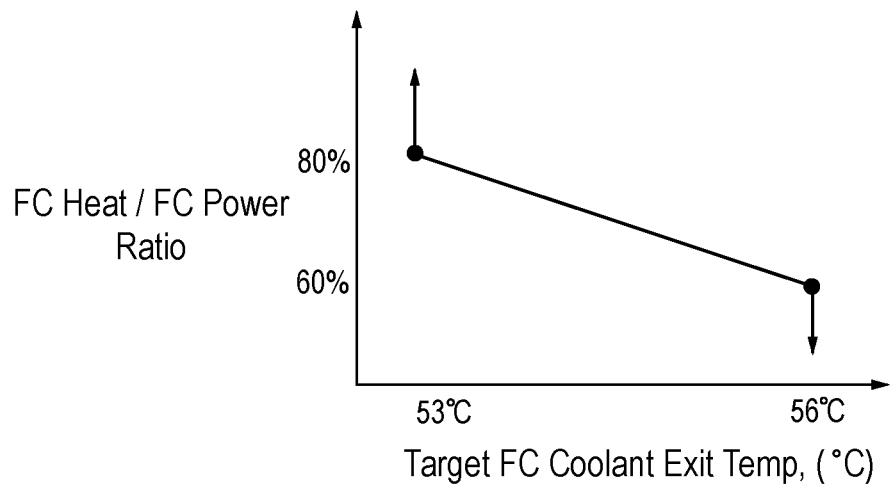
FIGS. 7A and 7B are exemplary graphs illustrating calibration lines for mapping a target and max FC coolant exit temperature, respectively.
Figure 7B:
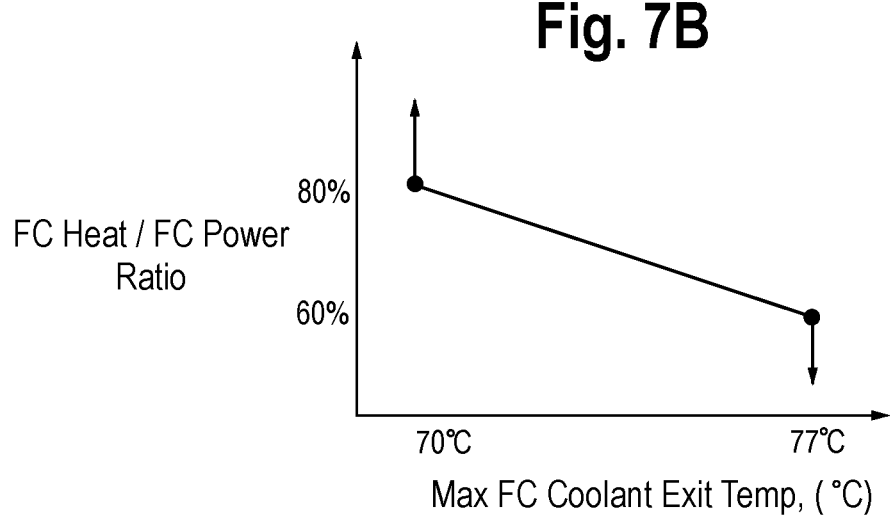

Referring to FIGS. 7A and 7B, they illustrate graphs for mapping each of the target and max FC coolant exit temperature according to an exemplary form of the present disclosure. Both graphs in FIGS. 7A and 7B are determined for mapping the target and max FC coolant exit temperature, respectively, based on data obtained for the FC Heat to FC Power ratio at the beginning of life and end of life of the fuel cell stack 12. FIG. 7A shows a calibration line as an example for mapping a real time target FC coolant exit temperature. In FIG. 7A, if the current input FC Heat to FC Power ratio approaches 80% because the fuel cell stack reaches at the end of the life, the controller 20 lowers the target FC coolant exit temperature of the system 10 to compensate the excess heat generated from the fuel cell stack 12 due to degradation. FIG. 7B shows a calibration line for mapping a max FC coolant exit temperature. In FIG. 7B, if the input FC Heat to FC Power ratio approaches 80%, because the fuel cell stack reaches at the end of the life, the controller 20 lowers the max FC coolant exit temperature of the system 10 to avoid damage of the fuel cell stack 12 from overheating due to the degradation of the fuel cell stack 12.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A coolant temperature control system for a fuel cell (FC) stack in a vehicle, the coolant temperature control system comprising:
   non-transitory computer readable media comprising instructions executable to determine a real time target exit temperature of a FC coolant; and
   a controller configured to execute the instructions to:
   cause a voltage sensor to detect a FC voltage;
   cause a current sensor to detect a FC current;
   calculate an input FC Heat to FC Power ratio by using a FC Heat and a FC Power that are calculated based on the detected FC voltage and the detected FC current;
   determine a minimum exit temperature of the FC coolant in a beginning of life of the FC stack by causing a coolant inlet temperature sensor to measure a temperature of the FC coolant entering the FC stack;
   determine a maximum exit temperature of the FC coolant in an end of life of the FC stack by causing a coolant exit temperature sensor to measure a temperature of the FC coolant exiting the FC stack;
   match the minimum exit temperature of the FC coolant with a maximum FC Heat to FC Power ratio that is calculated in the end of life of the FC stack;

match the maximum exit temperature of the FC coolant with a minimum FC Heat to FC Power ratio that is calculated in the beginning of life of the FC stack; and determine the real time target exit temperature of the FC coolant corresponding to the input FC Heat to FC Power ratio that is a value between the minimum FC Heat to FC Power ratio and the maximum FC Heat to FC Power ratio.

2. The coolant temperature control system of claim 1, wherein the controller determines to activate the temperature control system for evaluating the real time target exit temperature of the FC coolant when a trip distance of the vehicle is greater than a predetermined travel distance.

3. The coolant temperature control system of claim 2, wherein the controller sets 30 km as the predetermined travel distance for activating to evaluate the real time target exit temperature of the FC coolant.

4. The coolant temperature control system of claim 1, wherein the controller is configured to calculate the FC Heat by the following formula: FC Heat=[1.25×(# of FC)−FC Voltage]×FC Current, and the FC Power by the following formula: FC Power=FC Voltage×FC Current.

5. The coolant temperature control system of claim 1, wherein the controller is configured to calculate a slope of a calibration line (m) and a x-intercept of the slope of the calibration line (X) by the following formulae:

$$m = \frac{Ratio_{max} - Ratio_{min}}{T_{FC\_Min} - T_{FC\_Max}} \text{ and } X = \frac{m \cdot T_{FC\_Max} - Ratio_{min}}{m}.$$

6. The coolant temperature control system of claim 5, wherein the controller is configured to calculate the real time target exit temperature of the FC coolant with the input FC Heat to FC Power ratio by the following formula:

$$T_{FC\_Target} = X + \frac{Ratio_{input}}{m} + \max\left(\left(T_{FC\_Min} - \left(X + \frac{Ratio_{input}}{m}\right)\right), 0\right) + \min\left(\left(T_{FC\_Max} - \left(X + \frac{Ratio_{input}}{m}\right)\right), 0\right).$$

7. A computer-implemented method performed by a controller comprising non-transitory computer readable media configured to execute instructions to determine a real time target exit temperature of a fuel cell (FC) coolant stored in memory for controlling a coolant temperature for a FC stack of a vehicle, the method comprising:

causing a voltage sensor to detect a FC voltage;
causing a current sensor to detect a FC current;
calculating an input FC Heat to FC Power ratio by using a FC Heat and a FC Power that are calculated based on the detected FC voltage and the detected FC current;
determining a minimum exit temperature of the FC coolant in a beginning of life of the FC stack by causing a coolant inlet temperature sensor to measure a temperature of the FC coolant entering the FC stack;
determining a maximum exit temperature of the FC coolant in an end of life of the FC stack by causing a coolant exit temperature sensor to measure a temperature of the FC coolant exiting the FC stack;
matching the minimum exit temperature of the FC coolant with a maximum FC Heat to FC Power ratio that is calculated in the end of life of the FC stack;
matching the maximum exit temperature of the FC coolant with a minimum FC Heat to FC Power ratio that is calculated in the beginning of life of the FC stack; and
determining the real time target exit temperature of the FC coolant corresponding to the input FC Heat to FC Power ratio that is a value between the minimum FC Heat to FC Power ratio and the maximum FC Heat to FC Power ratio.

8. The method of claim 7, further comprising:
evaluating a trip distance of the vehicle; and
determining to activate for evaluating the real time target exit temperature of the FC coolant when the trip distance of the vehicle is greater than a predetermined travel distance.

9. The method of claim 8 comprising:
setting 30 km as the predetermined travel distance to evaluate the real time target exit temperature of the FC coolant.

10. The method of claim 7 comprising:
calculating the FC Heat by the following formula: FC Heat=[1.25×(# of FC)−FC Voltage]×FC Current, and the FC Power by the following formula: FC Power=FC Voltage x FC Current.

11. The method of claim 7, further comprising:
calculating a slope of a calibration line (m) and a x-intercept of the slope of the calibration line (X) by the following formulae:

$$m = \frac{Ratio_{max} - Ratio_{min}}{T_{FC\_Min} - T_{FC\_Max}} \text{ and } X = \frac{m \cdot T_{FC\_Max} - Ratio_{min}}{m}.$$

12. The method of claim 11, further comprising:
calculating the real time target exit temperature of the FC coolant with the input FC Heat to FC Power ratio by the following formula:

$$T_{FC\_Target} = X + \frac{Ratio_{input}}{m} + \max\left(\left(T_{FC\_Min} - \left(X + \frac{Ratio_{input}}{m}\right)\right), 0\right) + \min\left(\left(T_{FC\_Max} - \left(X + \frac{Ratio_{input}}{m}\right)\right), 0\right).$$

* * * * *